United States Patent [19] [11] 3,863,778
Martin, Sr. [45] Feb. 4, 1975

[54] ROLL STORAGE DEVICE HAVING AN ELEVATOR WITH PIVOTAL LOAD SUPPORTING MEANS

[75] Inventor: Thomas W. Martin, Sr., Nashville, Tenn.

[73] Assignee: Cutters Machine Company, Inc., Nashville, Tenn.

[22] Filed: Nov. 24, 1972

[21] Appl. No.: 309,432

Related U.S. Application Data

[60] Continuation of Ser. No. 117,514, Feb. 22, 1971, abandoned, which is a division of Ser. No. 831,848, June 10, 1969, Pat. No. 3,601,270.

[52] U.S. Cl.. 214/16.4 R, 214/16.1 CB, 214/16.4 A
[51] Int. Cl............................................. B65g 1/06
[58] Field of Search... 214/16.4 R, 16.4 A, 16.1 CB, 214/95 R

[56] References Cited
UNITED STATES PATENTS
| | | | |
|---|---|---|---|
| 1,832,000 | 11/1931 | Caesar et al. | 214/95 R |
| 1,949,964 | 3/1934 | Keller et al. | 198/26 |
| 2,790,567 | 4/1957 | Rockhill | 214/95 R |
| 2,798,267 | 7/1957 | Anderson | 104/48 X |
| 3,173,557 | 3/1965 | Eliassen | 214/16.4 R |
| 3,502,320 | 3/1970 | Scordato | 270/31 |

FOREIGN PATENTS OR APPLICATIONS
| | | | |
|---|---|---|---|
| 1,504,813 | 10/1967 | France | 214/16.4 R |

Primary Examiner—Robert J. Spar
Assistant Examiner—R. B. Johnson
Attorney, Agent, or Firm—Harrington A. Lackey

[57] ABSTRACT

An automobile cloth roll loading apparatus including an inclined roll supporting platform, a stationary barrier cooperating with the lower end portion of the platform, and means for raising the platform to a dumping or discharge position above the barrier and for lowering the platform to a roll storage position in cooperation with the barrier.

A further feature of the apparatus is a cloth roll storage truck having at least one roll supporting cradle adjacent the upper end of the platform, and pivotal fingers projecting from the rear of the platform adapted to interdigitate with the cradle in order to lift and remove one roll at a time from the truck to the platform on each upward movement of the platform.

5 Claims, 7 Drawing Figures

INVENTOR:
THOMAS W. MARTIN, Sr.
BY

ATTORNEY

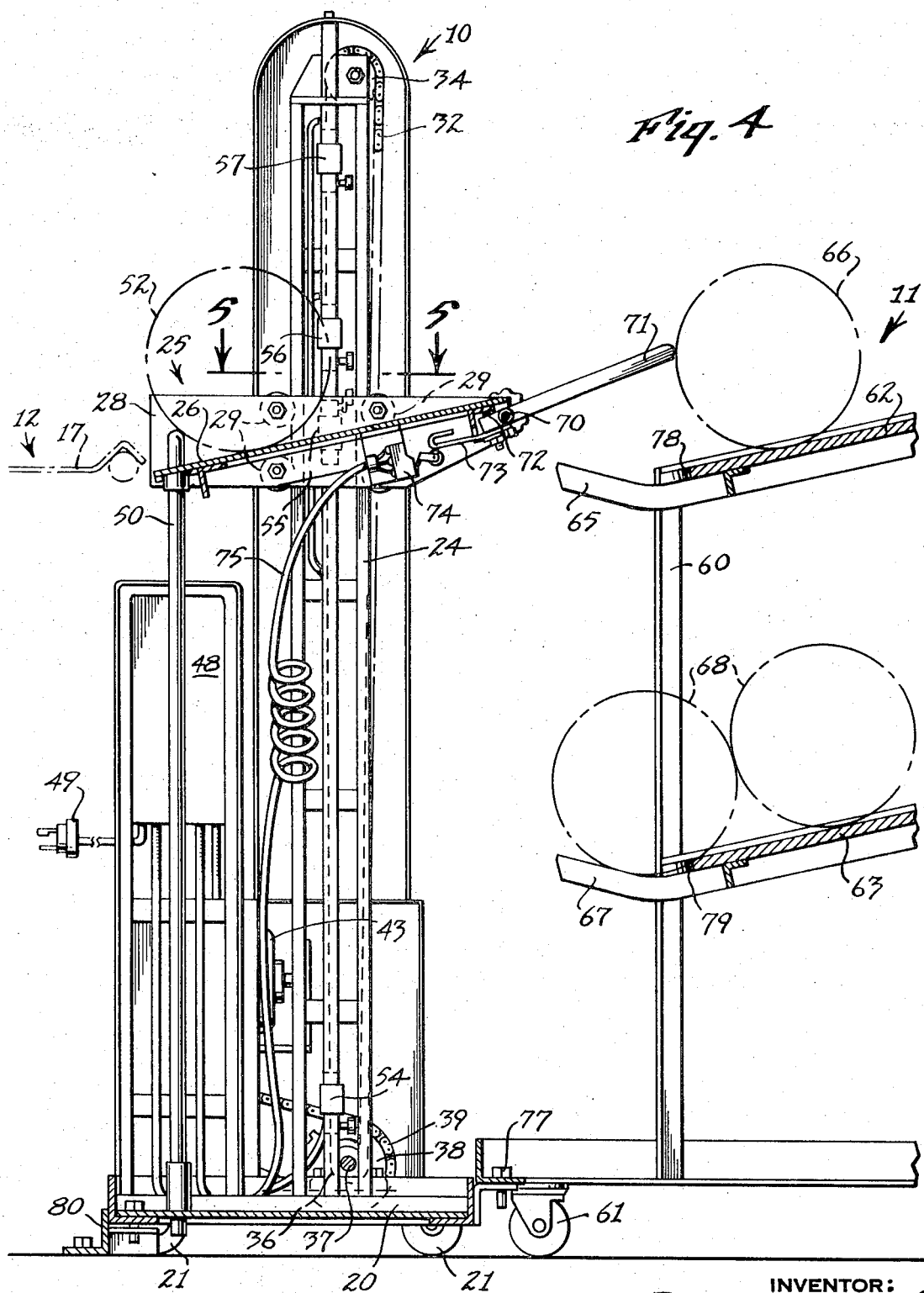

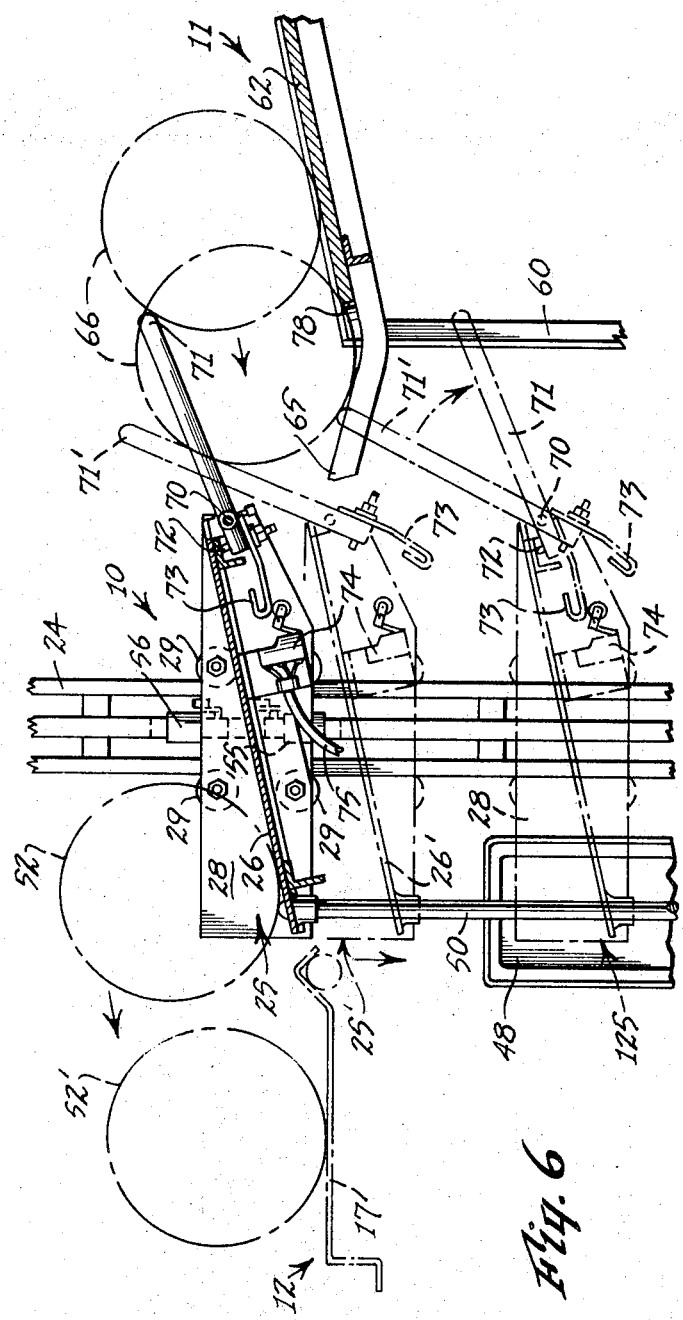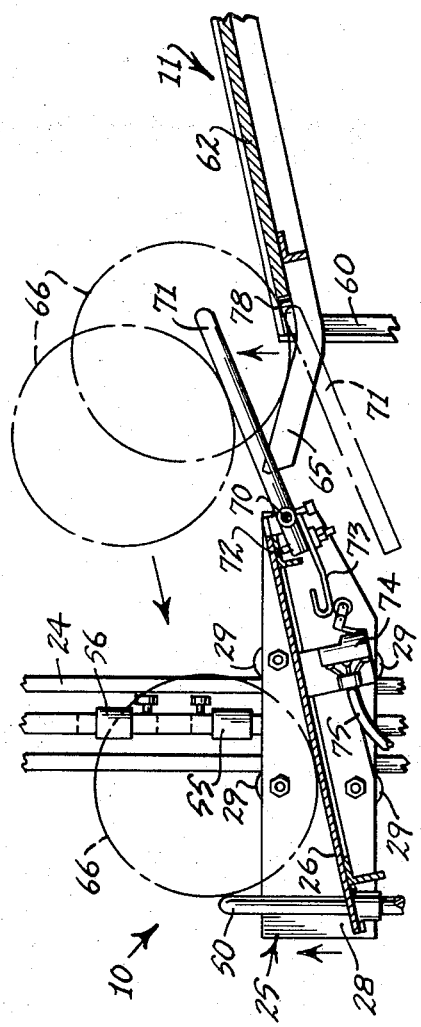

ROLL STORAGE DEVICE HAVING AN ELEVATOR WITH PIVOTAL LOAD SUPPORTING MEANS

CROSS-REFERENCES TO RELATED APPLICATION

This is a continuation of application Ser. No. 117,514, filed Feb. 22, 1971, now abandoned, which was a division of original application Ser. No. 831,848, filed June 10, 1969, now U.S. Pat. No. 3,601,270, issued Aug. 24, 1971.

BACKGROUND OF THE INVENTION

This invention relates to a roll loading apparatus, and more particularly to an apparatus adapted to automatically store a plurality of rolls and to feed or discharge one roll at a time to a discharge station, such as a cloth spreading machine.

In the art of spreading cloth from a roll, the cloth spreading machine is provided with a support for one roll of cloth in operative position for spreading. After the spreading operation has exhausted each roll, the machine must be stopped, and another roll of cloth is mounted upon the roll support. The cloth from the roll is then threaded through the various guide rollers and bars and through the spreading elements, such as the fold or tuck blades. Usually, the rolls are manipulated by hand, but where excessively large rolls, or rolls of heavy web material, are used, hoisting machinery must be employed. Regardless of the size or weight of the roll, or the various operations for mounting the rolls on the machine, considerable time is lost in the loading operation.

SUMMARY OF THE INVENTION

It is an object of this invention to provide a roll loading apparatus, annd particularly an apparatus which is adapted to load a roll of cloth upon a cloth spreading machine automatically within a matter of seconds, whenever a new roll is needed upon the machine.

This apparatus contemplates a loading apparatus which is also provided with a mechanism for storing one or more cloth rolls upon an elevator platform which will hold the roll or rolls until needed, and then, upon signal, elevate and discharge the roll upon the cloth spreading machine.

The apparatus further contemplates a loading assembly including a rack having a large capacity for storage of a plurality of cloth rolls, and for automatically feeding the rolls from the rack to the loading apparatus so that there will be an ample supply of cloth rolls at all times.

The apparatus is also rendered portable so that it may be moved to different locations for supplying rolls to more than one cloth spreading machine.

BRIEF DESCRIPTION OF THE DRAWINGS

FIG. 4 is an enlarged section taken along the line 4—4 of FIG. 3, showing the storage truck fragmentarily;

FIG. 6 is a fragmentary side elevation of the upper portions of the assembly showing the feeding and loading operations in sequence; and FIG. 7 is a fragmentary side elevation similar to FIG. 6, showing additional operational sequences.

DESCRIPTION OF THE PREFERRED EMBODIMENT

Figure 1:
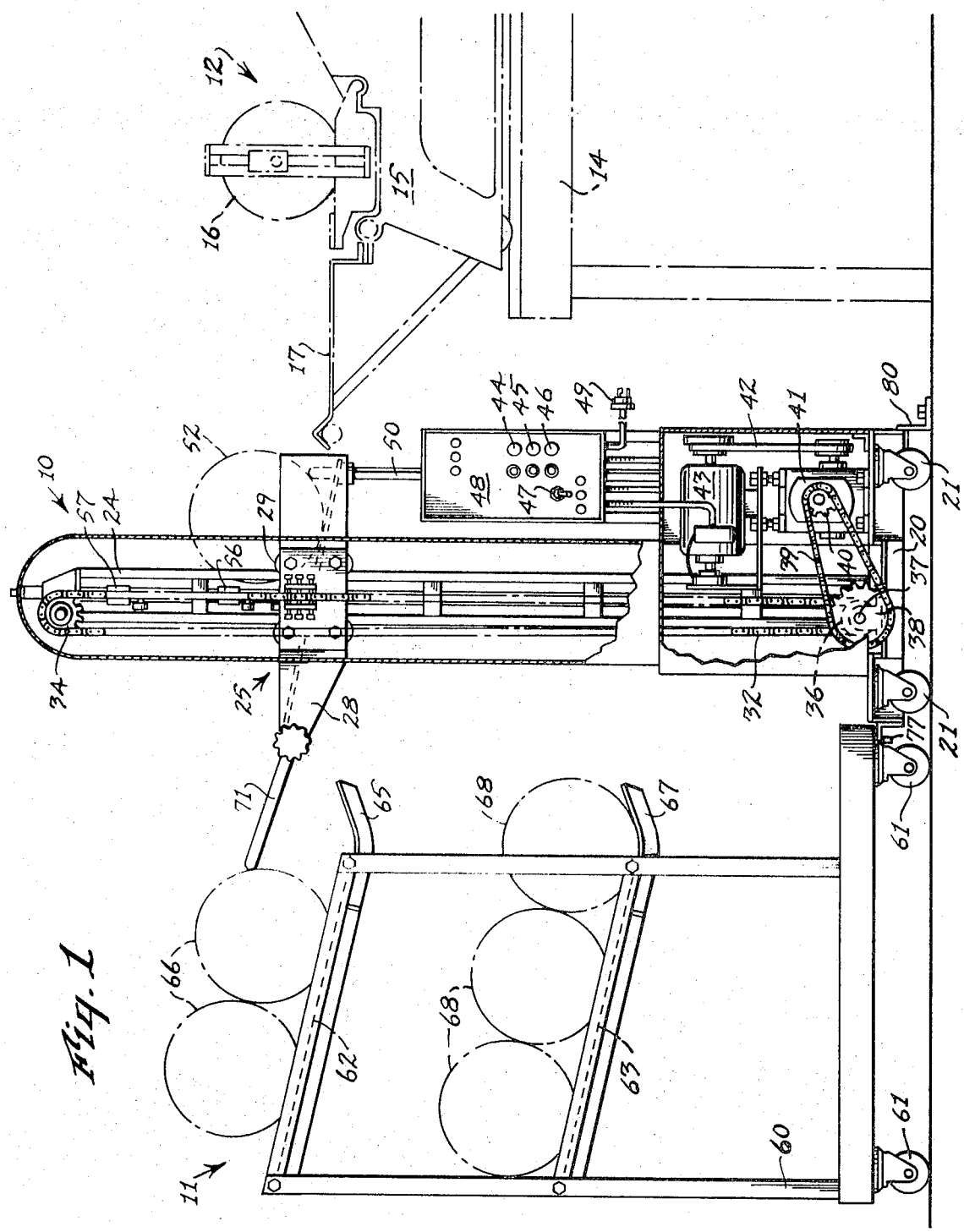
FIG. 1 is a side elevation of the loading apparatus, with parts broken away, including a loading unit and a roll storage truck, and disclosing a portion of a cloth spreading machine, in phantom.

Referring now to the drawings in more detail, FIG. 1 discloses a preferred form of loading apparatus, including a loading unit or loader 10 and a storage truck 11, for loading cloth rolls upon a cloth spreading machine 12.

The spreading machine 12, disclosed in phantom in FIG. 1, is shown stopped at one end of a cloth spreading table 14, and includes a mobile frame 15 supporting a cloth supply roll 16 in operative position for spreading, and also is provided with an auxiliary cloth roll support platform or bed 17 projecting rearwardly over the end of the table 14.

The loading unit 10 includes a base frame 20 mounted on rollers 21 and supporting a pair of upstanding end frames 23 and 24. Extending longitudinally between the end frames 23 and 24 and adapted to travel in vertical reciprocation therebetween is a platform member 25. The platform member 25 includes a flat, plane, roll supporting surface 26 inclined to the horizontal and sloping downward so that its lower end or edge is at the front of the loading unit 10 and its upper edge or end is at the rear of the unit 10. The inclined platform surface 26 is supported at its opposite sides by plate members 27 and 28 provided with guide rollers 29 adapted to rollably engage and travel vertically along the front and rear vertical faces of the end frames 23 and 24 which provide tracks for the guide rollers 29.

Each side platform plate member 27 and 28 is fixed to one leg of the corresponding endless chain 31 and 32 trained about corresponding upper sprockets 33 and 34 and lower sprockets 35 and 36. The upper sprockets 33 and 34 are mounted upon the respective end frames 23 and 24, while the lower sprockets 35 and 36 are fixed to a common shaft 37, which also supports driven sprocket 38. Rotary motion is transmitted to driven sprocket 38 through chain 39 from drive sprocket 40 mounted on speed reducer 41, which in turn is driven through the belt transmission 42 from electric motor 43.

Electric motor 43 is a reversible type motor and may be controlled manually through the UP switch 44, DOWN switch 45, STOP switch 46 and power switch 47 on the switch panel 48 (FIG. 1). Electricity may be supplied to panel 48 from any convenient source through the electric cable 49. In this manner, the platform member 25 may be raised, lowered or stopped, in any position relative to the upstanding end frames 23 and 24.

Adapted to cooperate with the lower end portion of the inclined platform surface 26 is a cloth roll barrier including the upstanding barrier rods or posts 50. The barrier posts 50 project upwardly from the front portion of the base frame 20. Each post is aligned with a corresponding guide hole 51 in the lower front portion of the inclined platform surface 26. In this manner, the free standing posts 50 are maintained in their substantially vertical positions when engaged by a heavy cloth roll such as 52, supported on the platform surface 26.

Mounted upon the upstanding end frame 24 are a plurality of electrical limit switches connected to the electrical motor 43 by circuitry, not shown. Mounted adjacent the bottom of the end frame 24 is a lower reversing switch 54. A stop limit switch 55, an upper limit switch 56, and a safety stop switch 57 are mounted on the upper portion of the end frame 24, as best disclosed in FIG. 4. Each of these limit switches 54, 55, 56 and 57 are adapted to be actuated by the side frame member 28 of the platform member 25 as the side frame 28 engages the lever arm of each of the switches.

The upper reversing switch 56 is so located that it is actuated by the side frame 28 when the inclined platform surface 26 is approximately flush with the free top ends of the barrier posts 50, in which position, the roll, such as cloth roll 52, is permitted to roll over the ends of the posts and be discharged upon any desired location or discharge station, such as the auxiliary platform 17 of the cloth spreader 12.

The stop switch 55 is located slightly below the upper reversing switch 56 to permit the platform member 25 to stop at the positions disclosed in FIGS. 1 and 4 in a storage position preparatory to discharge.

The lower reversing switch 54 may be located at any position in which it is desired to reverse the motion of the platform member 25 from down to up.

The safety stop switch 57 is optional, and is merely provided so that if the platform member 25 continues upward without actuating switches 55 or 56, so that the guide holes 51 are above the barrier posts 50, the movement of the platform member 25 will be stopped. The platform member 25 can then be manually restored to its normal operating position within the limits of the upper and lower switches 56 and 54.

In order to provide an ample supply of cloth rolls readily available to the loading unti 10, and to provide means for automatically pg,6 feeding the reserve rolls to the loading unit 10, the storage truck 11 is provided. The truck 11 is basically a portable frame 60 mounted on wheels 61 including a plurality of vertically spaced inclined shelves, such as the upper shelf 62, and the lower shelf 63. Shelves 62 and 63 are preferably inclined at the same angle to the horizontal and slope forward and downward.

Projecting from the front edge of the upper shelf 62 is a cloth roll supporting cradle comprising a plurality of longitudinally and horizontally spaced, upwardly concave cradle arms 65. The cradle arms 65 are so supported that when a roll, such as 66, is placed upon the upper rear end of the upper shelf 62, it will roll forward, down the shelf 62, and will rest in a stationery position upon the cradle arm 65.

Cradle arms 67, identical to the cradle arms 65, project forward from the front edge of the lower shelf 63 and are vertically spaced beneath the upper cradle arms 65 to support a cloth roll 68 gravitating upon the cradle arms 67 from the lower shelf 63.

As disclosed in FIG. 1, each shelf 62 and 63 will support several cloth rolls, and after a roll is removed from the corresponding cradle arms 65 or 67, the next succeeding cloth roll will gravitate into the same position upon the cradle arms 65 and 67, respectively.

Pivotally mounted upon a rod or shaft 70, extending across and beneath the upper end of the platform surface 26 are a plurality of roll engaging fingers 71. The front end of each finger 71 is provided with a stop pin 72 to limit the downward swinging movement of the finger 71 to substantially the same inclined direction as the inclination of the platform surface 26, as disclosed in solid lines in FIGS. 1, 4, 6 and 7. On the other hand, the fingers 71 may swing to raised positions such as indicated in phantom in FIG. 6.

Also, at least one of the fingers 71 is provided with a switch arm 73 adapted to engage and actuate a reversing limit switch 74 mounted on the bottom of the platform surface 26, as best disclosed in FIGS. 4, 6 and 7. The limit switch 74 is connected through electrical cord 75 to electrical motor 43.

Figure 2:
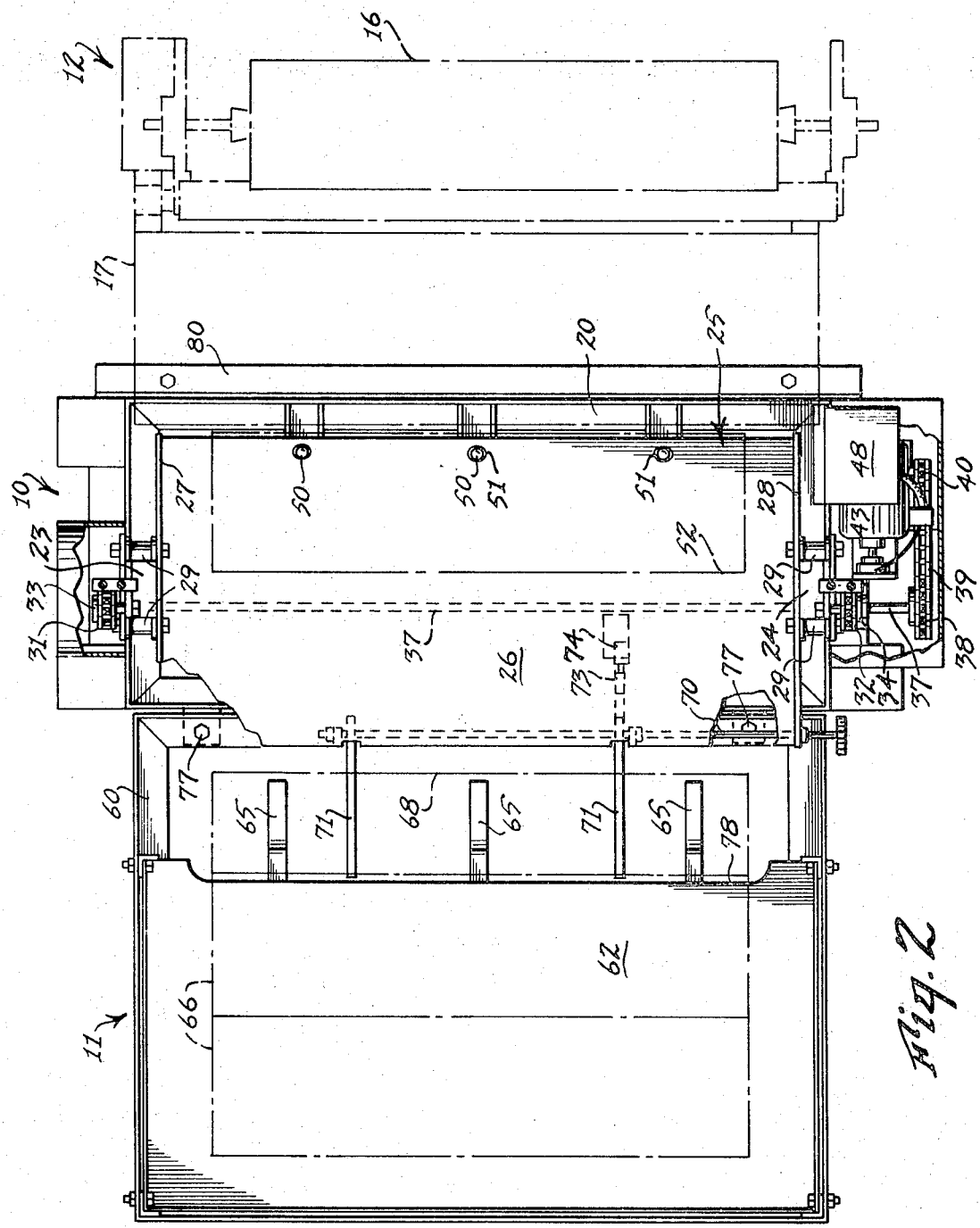
FIG. 2 is a top plan view, with parts broken away, of the assembly disclosed in FIG. 1.
Figure 3:
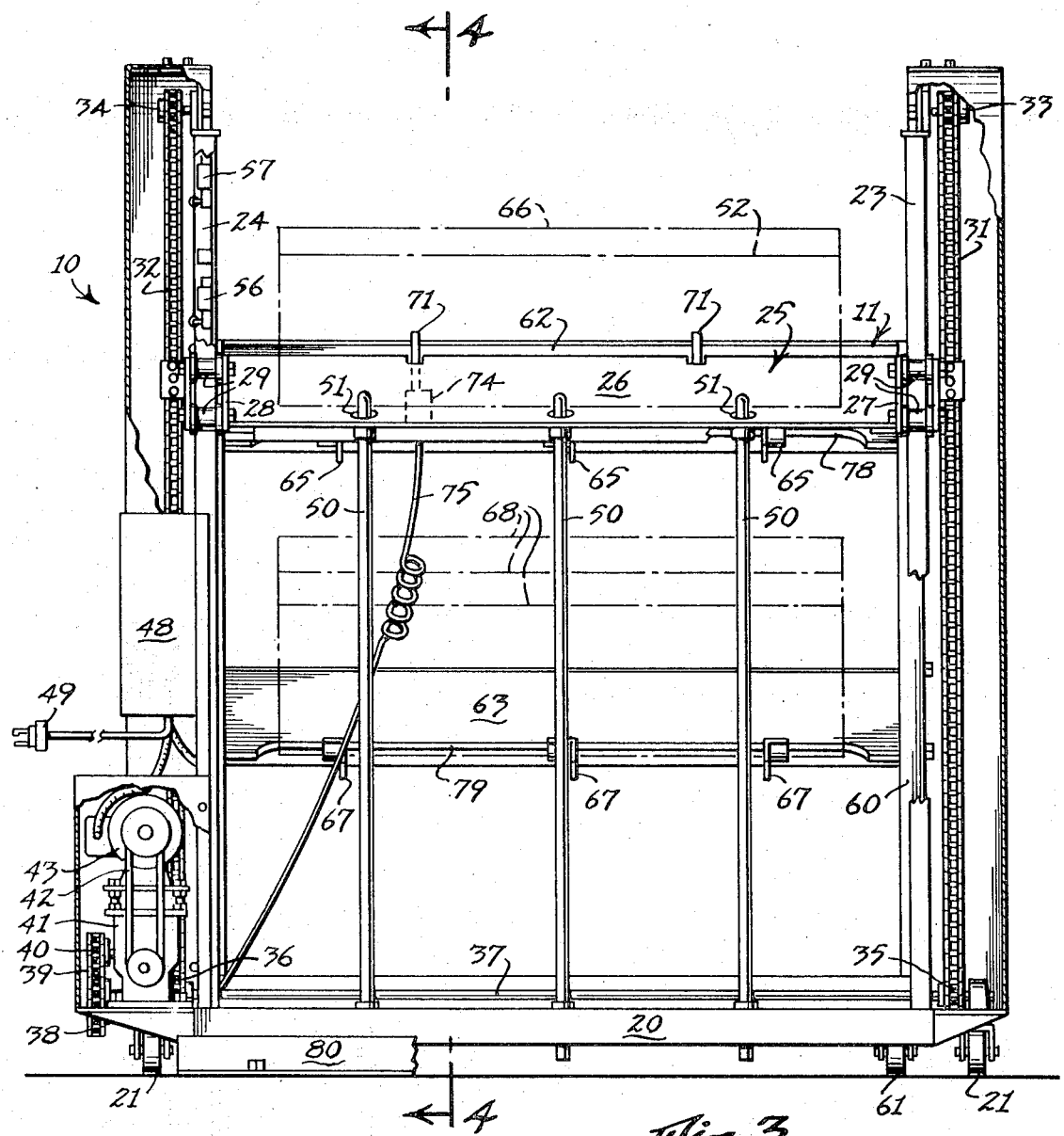
FIG. 3 is a front elevation of the loading apparatus, with parts broken away.
Figure 5:
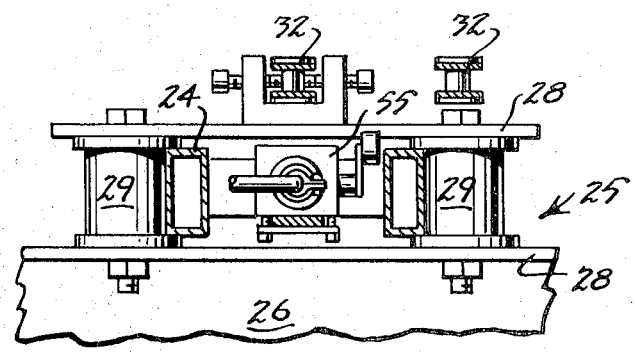
FIG. 5 is a fragmentary section taken along the line 5—5 of FIG. 4.

As disclosed in the drawings, when the storage truck 11 is in operative position, its frame 60 is coupled to the base frame 20 by means such as pins 77. In this operative position, the fingers 71 in their solid-line projected position are adapted to move up and down between the cradle arms 65 and 67. Thus, the cradle arms 65 and 67 must be vertically disaligned from the fingers 71 to permit interdigitation of the arms 65 and 67 and fingers 71 during the vertical movement of the platform member 25. It will also be noted that both shelves 62 and 63 are recessed at 78 and 79, respectively, to permit clearance of the projecting ends of the fingers 71 (FIGS. 2 and 4).

When the loading unit 10 is in operative position for loading a cloth spreading machine 12 on a spreading table 14, it may be anchored to the floor by means such as a bolted anchor member or bar 80.

One example of the operation of this invention is as shown in the drawings. The loading unit 10 is moved into operative position as disclosed in FIG. 1 at the rear end of a spreading table 14, and secured in operative position by the anchor member 80. In order to provide a large quantity of cloth rolls to the loading unit 10, the storage truck 11 is moved behind the loading unit 10 and secured thereto by the coupling pins 77 so that the truck 11 occupies a position relative to the loading unit 10 as disclosed in FIGS. 1, 2, 4, 6 and 7.

Assuming that both the upper shelf 62 and lower shelf 63 of the truck 11 are filled with cloth rolls 66 and 68, respectively, and there is no cloth roll on the platform member 25 of the loading unit 10, the loading unit 10 must be actuated to transfer a cloth roll from the truck 11 to the unit 10.

Assuming that the platform member 25 is located at an elevation such that the fingers 71 project above the rolls 68 on the lower shelf 63, but below the cradle arms 65, then the power switch 47 is turned on and the manual UP switch 44 is depressed. The platform member 25 moves upward carrying the fingers 71 up between the cradle arms 65 to engage and lift the front cloth roll 66 until it has cleared the cradle arms 65. The roll 66 then gravitates down the inclined fingers 71 and the inclined platform surface 26 until the roll rests against the upwardly projecting barrier posts 50, as shown in FIG. 7. The upward movement of the platform member 25 continues until its side plate member 28 engages and actuates the stop switch 55. The actuated stop switch 55 de-energizes the motor 43 to stop the platform member 25 in its normal inoperative position as shown in FIGS. 1 and 4, preparatory to loading the cloth spreading machine 12.

As shown in FIGS. 1 and 4, the projecting fingers 71 hold the next cloth roll 66 in a position on the upper shelf 62 above the cradle arms 65, until the motion of the platform member 25 is resumed.

The particular embodiment of the cloth spreading machine 12 disclosed in FIG. 1 includes a cloth supply roll 16 in operative position ready to spread, but the spreading machine may also support an auxiliary cloth roll upon bed 17. When the machine 12 is in its rear position as disclosed in FIG. 1 with the auxiliary bed 17 empty, then the manual UP switch button 44 may be depressed to resume the upward movement of the platform member 25; or such upward movement may be instituted automatically by a signal responsive to the empty bed 17.

When the platform member 25 reaches the solid-line position disclosed in FIG. 6, the platform surface 26 is substantially flush with the upper ends of the barrier posts 50 permitting the roll 52 to gravitate over the tops of the barrier posts 50 and to drop upon the auxiliary roll bed 17 to occupy the position 52'. As shown in FIG. 6, in this unloading position, the side plate member 28 actuates the upper reversing switch 56 to reverse the direction of the motor 43 and initiate the downward movement of the platform member 25.

As the platform member 25 moves from its stopped, inoperative position 25' upward in FIG. 6 to its unloading position, disclosed in solid lines, the fingers 71 are elevated to permit the front cloth roll 66 to gravitate down upon the cradle arms 65. As the platform member 25 moves downward, the front roll 66 pivots the fingers 71 to their raised positions 71', causing the switch arm 73 to dis-engage the reversing switch 74. However, the disengagement of the switch arm 73 and switch 74 does not actuate the switch 74, so that platform member 25 continues its descent to the position 125 illustrated in FIG. 6, in phantom. In the position 125, the fingers 71 are released from their raised positions 71' and drop by gravity to their original positions 71. The reengagement of switch arm 73 with reversing switch 74 actuates switch 74 to energize the motor 43 and reverse the movement of the platform member in position 125 from down to up.

As illustrated in FIG. 7, the cycle is repeated. The fingers 71, when they reach the phantom position in FIG. 7, engage and lift the top front roll 66, and as the platform member 25 continues upward, the roll 66 is permitted to gravitate down the inclined fingers 71 and platform surface 26 until the roll 66 engages the barrier posts 50, as illustrated by the solid-line position of the platform member 25 in FIG. 7. Platform member 25 continues upward until it again engages and actuates the stop switch 55 at which time the platform is stopped in the solid-line position preparatory to loading disclosed in FIGS. 1 and 4.

After the cloth spreading machine 12 has exhausted the roll 16, and the auxiliary roll supported on bed 17 is placed in operative position for spreading, the necessary controls may be actuated to repeat the cycle of the loading unit 10 to supply the bed 17 with another auxiliary cloth roll.

The sequence of operation continues until the upper shelf 62 is exhausted of cloth rolls 66. When this occurs, the platform member 25 will continue downward after engaging the upper reversing switch 56, and the fingers 71 will remain in their projected position until they engage the top of the front cloth roll 68 on the lower shelf 63. The fingers 71 will then function in the same manner as if the fingers 71 had engaged the front roll 66 in the upper cradle arms 65. The front roll 68 will bias the fingers 71 to their raised positions 71' disclosed in FIG. 6, until the fingers 71 have cleared the front roll 68 and resumed their normal projected position, thereby energizing the reversing switch 74 to again move platform member 25 upward. On this upward movement, the projected fingers 71 will lift the front roll 68 causing it to gravitate down against the barrier posts 50. However, the platform member 25 will continue upward until it engages the same stop switch 55 and the platform member 25 again occupies its inoperative stationary loading position, disclosed in solid lines in FIGS. 1 and 4.

This sequence of operations will continue until the lower shelf 63 is also exhausted of rolls 68. After all the rolls are exhausted, the storage truck 11 may be supplied with additional rolls, or another fully loaded storage truck 11 may be substituted for the exhausted one.

What is claimed is :

1. A roll loading apparatus comprising:
  a. a base frame,
  b. an elevator member,
  c. means mounting said elevator member on said base frame for vertical reciprocable movement,
  d. an elongated cradle adapted to support a roll in an elevated position,
  e. means supporting said cradle adjacent said base frame,
  f. at least one roll engaging finger,
  g. means pivotally mounting said finger on said elevator member to normally project toward said cradle at an inclination from said elevator member, said cradle being in the vertical path of said projected finger,
  h. an opening in said cradle adapted to register with each said finger to permit the vertical movement of said finger through said cradle,
  i. means limiting the pivotal movement of said finger between its normally inclined position and a raised position,
  j. motive means for raising and lowering said elevator member so that when said finger is moving up through said cradle said projecting finger lifts a roll supported by said cradle causing said roll to roll down said finger toward said elevator member, and when said finger is moving down through said cradle, a roll carried by said cradle deflects said finger to said raised position.
  k. a reversing limit switch on said elevator member adapted to be actuated by the pivotal movement of said finger, so that when said finger moves from its raised position to its inclined position, said reversing limit switch is actuated, said reversing limit switch being operatively connected to said motive means to reverse the direction of said elevator member from down to up when said reversing limit switch is actuated.

2. The invention according to claim 1 further comprising an upper reversing limit switch mounted on said base frame and adapted to be actuated by said elevator member at an upper limit of the vertical movement of said elevator member, the upper reversing limit switch being operatively connected to said motive means to reverse the movement of the elevator member from up to down when said upper limit reversing limit switch is actuated.

3. The invention according to claim 1 further comprising stop switch means mounted on said frame and adapted to be actuated by said elevator member when said elevator member is at an intermediate position between an upper and lower limit of the vertical reciprocable movement of said elevator member, said stop switch means being operatively connected to said motive means to stop the movement of said elevator member when said stop switch means is actuated.

4. The invention according to claim 1 in which said cradle is an upper cradle, and further comprising a lower cradle supported vertically below said upper cradle and having a lower opening in vertical alignment with the opening in said upper cradle to register with said finger.

5. The invention according to claim 4 in which said means supporting said upper and lower cradles comprises a storage truck having vertically spaced upper and lower shelves inclined to the horizontal, and extending upward from said upper and lower cradles, respectively, to support a plurality of rolls and permit said rolls to gravitate from said shelves to said corresponding cradles for interception by said finger.

* * * * *